United States Patent
Ohama

(10) Patent No.: US 6,287,218 B1
(45) Date of Patent: Sep. 11, 2001

(54) SOLID GOLF BALL

(75) Inventor: Keiji Ohama, Akashi (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/416,056

(22) Filed: Oct. 12, 1999

(30) Foreign Application Priority Data

Oct. 12, 1998 (JP) .................................................. 10-289364

(51) Int. Cl.$^7$ .................................................. A63B 37/12
(52) U.S. Cl. .............................................................. 473/377
(58) Field of Search .................................... 473/373, 372, 473/374, 377, 359

(56) References Cited

U.S. PATENT DOCUMENTS 3,239,228 * 3/1966 Crompton ........................... 473/377
5,697,856 * 12/1997 Moriyama et al. .................. 473/374

* cited by examiner

Primary Examiner—Mark S. Graham
Assistant Examiner—Raeann Gorden
(74) Attorney, Agent, or Firm—Birch, Stewart, Kolasch & Birch, LLP

(57) ABSTRACT

The present invention provides a solid golf ball having good shot feel, excellent flight performance and excellent durability. The present invention relates to a solid golf ball comprising one or more layers of core, and one or more layers of cover formed on the core, wherein the inmost core layer is formed from a vulcanized molded article of a rubber composition comprising 20 to 40 parts by weight of α,β-unsaturated carboxylic acid or metal salt thereof, 0.3 to 1.8 parts by weight of a vulcanization initiator, 0.1 to 5 parts by weight of an organic sulfide compound, based on 100 parts by weight of a base rubber, and has a trans-structure content after vulcanization of 10 to 50%, and the core has a rate of (B-A)/A of not less than 15%, wherein A is a center hardness in JIS-C hardness of the core and B is a surface hardness in JIS-C hardness of the core.

5 Claims, No Drawings

SOLID GOLF BALL

DEFINITION OF THE TERM

The term "trans-structure content" used herein means a ratio of trans-1,4 structure in polybutadiene backbone, calculated from the following expression:

$$\frac{\text{(Area of a peak corresponding to trans-1,4 structure in }^{13}\text{C-NMR spectrum)}}{\text{(Total of areas of peaks corresponding to cis-1,4, trans-1,4 and 1,2-structure in }^{13}\text{C-NMR spectrum)}} \times 100$$

FIELD OF THE INVENTION

The present invention relates to a solid golf ball. More particularly, it relates to a solid golf ball having good shot feel at the time of hitting, excellent flight performance and excellent durability.

BACKGROUND OF THE INVENTION

Many types of golf balls are commercially selling, but solid golf balls, such as two-piece solid golf balls, and thread wound golf balls are generally used for round games. The solid golf ball, when compared with the thread wound golf ball, has better flight performance and better durability. Therefore the solid golf ball is generally approved of or employed by many golfers. On the other hand, the solid golf ball, when compared with the thread wound golf ball, has poor shot feel and large impact force at the time of hitting, and poor controllability at approach shot because it has large ball velocity at the time of hitting and thus it has small spin amount.

In order to provide a solid golf ball having shot feel as good as the thread wound golf ball, a soft type solid golf ball using a softer core has been proposed. However, the use of the soft core adversely affects on rebound characteristics, thus resulting in the reduction of flight distance and the deterioration of durability.

OBJECTS OF THE INVENTION

A main object of the present invention is to provide a solid golf ball having good shot feel at the time of hitting, while maintaining excellent flight performance and excellent durability.

According to the present invention, the object described above has been accomplished by adjusting an amount of a co-crosslinking agent, an organic peroxide and an organic sulfide compound in the rubber composition for the core, and by controlling a trans-structure content in the core after vulcanization to a specified range, thereby providing a solid golf ball having good shot feel at the time of hitting, while maintaining excellent flight performance and excellent durability.

SUMMARY OF THE INVENTION

The present invention provides a solid golf ball comprising one or more layers of core, and one or more layers of cover formed on the core, wherein the inmost core layer is formed from a vulcanized molded article of a rubber composition comprising 20 to 40 parts by weight of α,β-unsaturated carboxylic acid or metal salt thereof, 0.3 to 1.8 parts by weight of a vulcanization initiator, 0.1 to 5 parts by weight of an organic sulfide compound, based on 100 parts by weight of a base rubber, and has a trans-structure content after vulcanization of 10 to 50%, and the core has a rate of (B-A)/A of not less than 15%, wherein A is a center hardness in JIS-C hardness of the core and B is a surface hardness in JIS-C hardness of the core.

DETAILED DESCRIPTION OF THE INVENTION

The solid golf ball of the present invention comprises one or more layers of core, and one or more layers of cover formed on the core. The core is obtained by mixing a rubber composition in a mixer such as a mixing roll, followed by press molding and vulcanizing the rubber composition at 140 to 170° C. and 90 to 120 kgf/cm² for 10 to 40 minutes in a mold. The rubber composition contains a base rubber, a co-crosslinking agent, a vulcanization initiator, an organic sulfide compound, a filler and the like.

The base rubber used for the core of the present invention may be natural rubber and/or synthetic rubber, which have been conventionally used for solid golf balls. Preferred is high-cis polybutadiene rubber containing not less than 40%, preferably not less than 80% of a cis-1,4-structure. The high-cis polybutadiene rubber may be mixed with natural rubber, polyisoprene rubber, styrene-butadiene rubber, ethylene-propylene-diene rubber (EPDM) and the like.

The co-crosslinking agent may be a α,β-unsaturated carboxylic acid or a metal salt thereof, for example, α,β-unsaturated carboxylic acids having 3 to 8 carbon atoms, such as acrylic acid, methacrylic acid and the like or mono or divalent metal salts, such as zinc, calcium or magnesium salts thereof. Preferred are zinc methacrylate, calcium methacrylate and zinc acrylate. The amount of the co-crosslinking agent may be from 20 to 40 parts by weight, preferably from 25 to 35 parts by weight, based on 100 parts by weight of the base rubber. When the amount of the co-crosslinking agent is larger than 40 parts by weight, the core is too hard, and the shot feel of the resulting golf ball is poor. On the other hand, when the amount of the co-crosslinking agent is smaller than 20 parts by weight, the core is too soft, and the rebound characteristics and durability are degraded.

The vulcanization initiator includes an organic peroxide, for example, dicumyl peroxide, 1,1-bis(t-butylperoxy)-3,3,5-trimethylcyclohexane, 2,5-dimethyl-2,5-di(t-butylperoxy) hexane, t-butyl peroxide and the like. Preferred are dicumyl peroxide and 1,1-bis(t-butylperoxy)-3,3,5-trimethylcyclohexane. The amount of the vulcanization initiator may be from 0.3 to 1.8 parts by weight, preferably 0.5 to 1.3 parts by weight, based on 100 parts by weight of the base rubber. When the amount of the vulcanization initiator is smaller than 0.3 parts by weight, the vulcanization of the rubber composition is sufficiently conducted. On the other hand, when the amount of the organic peroxide is larger than 1.8 parts by weight, the vulcanized rubber is too hard, and the shot feel of the resulting golf ball is poor.

The organic sulfide compound used for the present invention includes diphenyl polysulfides having 2 to 4 sulfur atoms, bis(4-methacryloyl thiophenyl)sulfide, 4,4'-dibromodiphenyl sulfide, morpholine disulfide and the like. Conversion from cis-structure into trans-structure occurs during vulcanization of the rubber composition for the core. The conversion is initiated or accelerated mainly by the organic sulfide compound used. Therefore the amount of the organic sulfide compound may be from 0.1 to 5.0 parts by weight, preferably from 0.5 to 4.0 parts by weight, based on 100 parts by weight of the base rubber. When the amount of the organic sulfide compound is smaller than 0.1 parts by weight, the technical effects of improving the rebound characteristics do not sufficiently exhibit, because the desired degree of the conversion can not be obtained. On the other hand, when the amount of the organic sulfide compound is larger than 5.0 parts by weight, the technical effects are not improved more. If the trans-structure content after vulcanization is increased by using a base rubber having a large trans-structure content before vulcanization, the technical effects do not sufficiently exhibit.

The filler used for the present invention, which can be typically used for the core of solid golf balls, includes for example, an inorganic filler (such as zinc oxide, barium sulfate, calcium carbonate and the like), a high specific gravity metal powder filler (such as powdered tungsten, powdered molybdenum, and the like), and the mixture thereof. The amount of the filler may be from 1 to 30 parts by weight, preferably from 3 to 25 parts by weight, based on 100 parts by weight of the base rubber. When the amount of the filler is smaller than 1 parts by weight, it is difficult to adjust the weight of the core. On the other hand, when the amount of the filler is larger than 30 parts by weight, the amount of the filler is too large and the rubber content in the core composition is small, which degrades the rebound characteristics of the resulting golf ball.

The rubber composition for the core of the golf ball of the present invention can contain other components, which have been conventionally used for preparing the core of solid golf balls, such as peptizing agent or antioxidant.

The core formed from the rubber composition comprising high-cis polybutadiene has typically a trans-structure content of 3 to 8%, and the core of the present invention optimized the rubber composition by using the above formulation has a trans-structure content after vulcanization of 10 to 50%, preferably 12 to 35%. When the trans-structure content after vulcanization is smaller than 10%, the core is too hard and the shot feel of the resulting golf ball is poor. On the other hand, when the trans-structure content after vulcanization is larger than 50%, the core is too soft and the rebound characteristics of the resulting golf ball are degraded. The trans-structure content after vulcanization can be adjusted to the above range by using a base rubber having a large trans-structure content before vulcanization, but the rebound characteristics of the resulting golf ball are degraded, of which the reason is not known at present.

The trans-structure content after vulcanization is larger than that of before vulcanization, and the difference from the trans-structure content after vulcanization to that of before vulcanization, that is, the trans-conversion rate, is 5 to 45%, preferably 7 to 30%. When the trans-conversion rate is smaller than 5%, the rebound characteristics are degraded. On the other hand, when the trans-conversion rate is larger than 45%, the rebound characteristics are degraded.

The core of the golf ball of the present invention has a surface hardness JIS-C hardness of 60 to 85, preferably 70 to 84, and has a rate of (B-A)/A of not less than 15%, wherein A is a center hardness in JIS-C hardness of the core and B is a surface hardness in JIS-C hardness of the core. When the surface hardness is higher than 85, the impact force at the time of hitting is too large, and the shot feel is poor. On the other hand, when the surface hardness is lower than 60, the core is too soft, and the rebound characteristics are degraded. When the rate of (B-A)/A is smaller than 15%, the hardness distribution in the core is uniform, and the shot feel of the resulting golf ball is poor. When the value of B is too large or the value of A is too small, the rate of (B-A)/A is too large. When the value of A is too small, the deformation amount of the core at the time of hitting is too large, thus the rebound characteristics and durability are degraded. When the value of B is too large, the impact force at the time of hitting is too large, and the shot feel is poor. Therefore the rate of (B-A)/A can be not more than 70%, preferably not more than 60%. The term "a center hardness of a core" as used herein refers to the hardness, which is obtained by cutting the core into two equal parts and then measuring a hardness at center point.

The core of the golf ball of the present invention has a deformation amount of 3.5 to 5.2 mm, preferably 3.7 to 5.0 mm when applying from an initial load of 10 kgf to a final load of 130 kgf on the core. When the deformation amount is smaller than 3.5 mm, the core is too hard and the shot feel of the resulting golf ball is poor. On the other hand, when the deformation amount is larger than 5.2 mm, the core is too soft and rebound characteristics are degraded.

In the golf ball of the present invention, the inmost core layer has a diameter of 30.0 to 40.7 mm, preferably 31.0 to 40.1 mm. The diameter is smaller than 30.0 mm, the technical effects accomplished by the presence of the inmost core layer are not sufficiently obtained. On the other hand, when the diameter is larger than 40.7 mm, it is difficult to form the cover.

The core of the golf ball of the present invention may have single layer structure or multi-layer structure that has two or more layers. When the core has multi-layer structure, the rubber composition of each layer may be the same or not. It is preferable that the each layer of the core essentially comprises the base rubber, co-crosslinking agent, vulcanization initiator and filler.

In the golf ball of the present invention, the core is covered with a cover. The cover may have single layer structure or multi-layer structure that has two or more layers. The cover of the golf ball of the present invention is preferably formed from thermoplastic resin, particularly ionomer resin, polyester, nylon and the like or a mixture thereof. The ionomer resin may be a eopolymer of α-olefin and α,β-carboxylic acid having 3 to 8 carbon atoms, of which a portion of carboxylic acid groups is neutralized with metal ion. Examples of the α-olefins in the ionomer preferably include ethylene, propylene and the like. Examples of the α,β-unsaturated carboxylic acid in the ionomer preferably include acrylic acid, methacrylic acid and the like. The metal ion which neutralizes a portion of carboxylic acid groups of the copolymer includes an alkali metal ion, such as a sodium ion, a potassium ion, a lithium ion and the like; a divalent metal ion, such as a zinc ion, a calcium ion, a magnesium ion, and the like; a trivalent metal ion, such as an aluminum ion and the like; and mixture thereof. Preferred are sodium ions, zinc ions, lithium ions and the like, in view of rebound characteristics, durability and the like. The ionomer resin is not limited, but examples thereof will be shown by a trade name thereof. Examples of the ionomer resins, which are commercially available from Du Pont Co., include Surlyn AD8541 and Surlyn AD8542. Examples of the ionomer resins, which are commercially available from Mitsui Du Pont Polychemical Co., Ltd., include Hi-milan 1555, Hi-milan 1557, Hi-milan 1605, Hi-milan 1652, Hi-milan 1705, Hi-milan 1706, Hi-milan 1707, Hi-milan 1855 and Hi-milan 1856. Examples of the ionomer resins, which are commercially available from Exxon Chemical Co., include Iotek 7010, Iotek 8000 and the like. These ionomer resins may be used alone or in combination.

The cover used in the present invention may optionally contain fillers (such as barium sulfate, calcium carbonate, etc.), pigments (such as titanium dioxide, etc.), and the other additives such as a dispersant, an antioxidant, a UV absorber, a photostabilizer and a fluorescent agent or a fluorescent brightener, etc., in addition to the resin component, as long as the addition of the additives does not deteriorate the desired performance of the golf ball cover. The amount of the pigment is preferably 0.1 to 5.0 parts by weight, based on 100 parts by weight of the resin component for the cover.

A method of forming the cover of the present invention is not specifically limited, but may be a well-known method, which has been conventionally used for forming golf ball cover. For example, there can be used a method which comprises the steps of molding the cover composition into a semi-spherical half-shell in advance, covering the solid core with the two half-shells, followed by pressure molding, or a method of injection molding the cover composition directly on the core to cover it.

The cover may have single layer structure or multi-layer structure, but the total thickness of the cover is from 1.0 to 6.5 mm, preferably from 1.3 to 6.0 mm. When the thickness is smaller than 1.0 mm, the hardness of the resulting golf ball is low, and the rebound characteristics are degraded. On the other hand, when the thickness is larger than 6.5 mm, the hardness of the resulting golf ball is high, the controllability and shot feel are poor. When the cover has multi-layer structure, it is desirable that the thickness of each layer is within the range of 1.0 to 3.5 mm, preferably 1.3 to 3.0 mm.

At the time of molding the cover, many depressions called "dimples" may be optionally formed on the surface of the golf ball. Furthermore, paint finishing or marking with a stamp may be optionally provided after the cover is molded for commercial purposes.

EXAMPLES

The following Examples and Comparative Examples further illustrate the present invention in detail, but are not to be construed to limit the scope of the present invention.

Examples 1 to 3 and Comparative Examples 1 to 5
Production of Solid Core

The rubber compositions for the core shown in Table 1 (Example) and Table 2 (Comparative Example) were mixed, and then vulcanized by press-molding in a mold at the vulcanization condition shown in the same Table to obtain spherical cores having a diameter of 39 mm. The trans-structure content before and after vulcanization, deformation amount and JIS-C hardness (surface hardness, center hardness and difference between the two) of the resulting core were measured. The results are shown in Table 4 (Example) and Table 5 (Comparative Example). The test methods are described later. The center hardness of the core is obtained by cutting the core into two equal parts and then measuring a hardness at center point.

TABLE 1

| | (parts by weight) Example No. | | |
|---|---|---|---|
| Core composition | 1 | 2 | 3 |
| BR11 *1 | 100 | 100 | 100 |
| Zinc acrylate | 25 | 30 | 35 |

TABLE 1-continued

| | (parts by weight) Example No. | | |
|---|---|---|---|
| Core composition | 1 | 2 | 3 |
| Zinc oxide | 10 | 8 | 6 |
| Barium sulfate | 10 | 10 | 10 |
| Morpholine disulfide | 0.5 | — | 4 |
| Diphenyl disulfide | — | 2 | — |
| Dicumyl peroxide | 0.9 | 0.5 | 0.9 |
| Vulcanization condition | *a | *a | *a |

TABLE 2

| | (parts by weight) Comparative Example No. | | | | |
|---|---|---|---|---|---|
| Core composition | 1 | 2 | 3 | 4 | 5 |
| BR11 *1 | 100 | 100 | 100 | — | 100 |
| BR71 *2 | — | — | — | 100 | — |
| Zinc acrylate | 25 | 35 | 18 | 45 | 25 |
| Zinc oxide | 10 | 4 | 15 | 3 | 10 |
| Barium sulfate | 10 | 10 | 10 | 10 | 10 |
| Morpholine disulfide | — | 3 | 0.05 | 5.5 | 0.5 |
| Dicumyl peroxide | 1.0 | 3.5 | 0.8 | 1.0 | 0.9 |
| Vulcanization condition | *a | *a | *a | *a | *b |

*1: High-cis Polybutadiene rubber (trade name "BR11") available from JSR Co., Ltd., Content of 1,4-cis-polybutadiene: 96%
*2: High-cis Polybutadiene rubber (trade name "BR71") available from JSR Co., Ltd., Content of 1,4-cis-polybutadiene: 35%
*3: Vulcanization initiator (trade name "Percumyl D") available from Nippon Yushi Co., Ltd.
(Vulcanization condition)
*a: at 155° C. for 30 minutes
*b: at 145° C. for 30 minutes and then at 170° C. for 10 minutes Preparation of Cover Compositions The formulation materials shown in Table 3 were mixed using a kneading type twin-screw extruder to obtain pelletized cover compositions. The extrusion condition was,
 a screw diameter of 45 mm,
 a screw speed of 200 rpm, and
 a screw L/D of 35.
The formulation materials were heated at 200 to 260° C. at the die position of the extruder.

TABLE 3

| Cover composition | Amount (parts by weight) |
|---|---|
| Hi-milan 1605 *4 | 50 |
| Hi-milan 1706 *5 | 50 |
| Titanium dioxide *6 | 4.0 |

*4: Hi-milan 1605 (trade name), ethylene-methacrylic acid copolymer ionomer resin obtained by neutralizing with sodium ion, manufactured by Mitsui Du Pont Polychemical Co., Ltd.
*5: Hi-milan 1706 (trade name), ethylene-methacrylic acid copolymer ionomer resin obtained by neutralizing with zinc ion, manufactured by Mitsui Du Pont Polychemical Co., Ltd.
*6: A-220 (trade name), titanium dioxide, manufactured by Ishihara Sangyo Co., Ltd.

Production of Golf Ball

The cover compositions were covered on the resulting core described above by injection molding. Then, deflashing, surface pretreatment for painting, paint and the like, which are generally done on the surface of a golf ball, were conducted on the surface to produce a golf ball having a diameter of 42.7 mm. With respect to the resulting golf balls, coefficient of restitution, flight distance (Carry), durability and shot feel were measured or evaluated. The results are shown in Table 4 (Example) and Table 5 (Comparative Example). The test methods are as follows.

(Test method)

(1) Trans-structure Content

The "trans-structure content" is determined by a $^{13}$C-NMR (Nuclear magnetic resonance) method. The trans-structure content before vulcanization is determined by a $^{13}$C-NMR spectrum obtained from a sample of a rubber composition before vulcanization and the trans-structure content after vulcanization is determined by a $^{13}$C-NMR spectrum obtained from a sample of a vulcanized rubber core, The difference between the trans-structure content before and after vulcanization is calculated and shown as trans-conversion rate.

(2) Deformation Amount

The deformation amount was determined by applying an initial load of 10 kg to a final load of 130 kg on the core.

(3) Coefficient of Restitution

An aluminum cylinder having a weight of 200 g was fired to strike against a golf ball at a speed of 40 m/sec, and the velocity of the golf ball and the cylinder before and after the strike was measured using an R & A initial velocity measuring equipment. The coefficient of restitution of the golf ball was calculated from the velocity and the weight of both the cylinder and the golf ball, and was indicated by an index when that of Comparative Example 1 was 100. The larger the number is, the better rebound characteristics the golf ball has.

(4) Flight Distance

A No. 1 wood club (a driver) was mounted to a swing robot manufactured by True Temper Co. and the resulting golf ball was hit at a head speed of 45 m/second, flight distance to the firstly dropping point on the ground (carry) was measured.

(5) Durability

After a No. 1 wood club (a driver) was mounted to a swing robot manufactured by True Temper Co., a golf ball was hit at a head speed of 45 m/second to strike against an impact board, repeatedly. The durability is the number of strike until the cover of the golf ball cracks, and is indicated by an index when that of Comparative example 1 is 100. When the number is more than 100, the golf ball has better durability than the golf ball of Comparative Example 1. The larger the number is, the better durability the golf ball has.

(6) Shot Feel

The shot feel of the golf ball is evaluated by 10 professional or top-amateur golfers according to a practical hitting test using a driver (a No. 1 wood club). The evaluation criteria are as follows.

(Evaluation criteria)

⊚: Not less than 8 out of 10 golfers felt that the golf ball has small impact force and good shot feel.

○: From 6 to 7 out of 10 golfers felt that the golf ball has small impact force and good shot feel.

Δ: From 4 to 5 out of 10 golfers felt that the golf ball has small impact force and good shot feel.

X : Not more than 3 out of 10 golfers felt that the golf ball has small impact force and good shot feel.

(2) Durability

A golf ball was put into a tube, and fired by air to strike against an impact board, repeatedly. The durability is the number of strike until the golf ball cracks, and is indicated by an index when that of Comparative example 5 is 100. When the number is more than 100, the golf ball can be put to practice use.

(Test results)

TABLE 4

| Test item | Example No. | | |
| --- | --- | --- | --- |
| | 1 | 2 | 3 |
| (Core) | | | |
| Trans-structure content before vulcanization (%) | 4 | 3 | 4 |
| Trans-structure content after vulcanization (%) | 15 | 21 | 36 |
| Trans-conversion rate (%) | 11 | 18 | 32 |
| Deformation amount (mm) | 4.4 | 4.2 | 3.9 |
| Center hardness (A) | 59 | 59 | 60 |
| Surface hardness (B) | 78 | 73 | 79 |
| (B-A)/A (%) | 32 | 24 | 32 |
| (Ball) | | | |
| Coefficient of restitution | 101 | 102 | 103 |
| Flight distance (Carry) (yard) | 240 | 242 | 244 |
| Durability | 100 | 110 | 120 |
| Shot feel | ⊚ | ⊚ | ⊚ |

TABLE 5

| Test item | Comparative Example No. | | | | |
| --- | --- | --- | --- | --- | --- |
| | 1 | 2 | 3 | 4 | 5 |
| (Core) | | | | | |
| Trans-structure content before vulcanization (%) | 3 | 4 | 4 | 51 | 4 |
| Trans-structure content after vulcanization (%) | 5 | 25 | 8 | 61 | 16 |
| Trans-conversion rate (%) | 2 | 21 | 4 | 10 | 12 |
| Deformation amount (mm) | 3.8 | 2.8 | 4.0 | 4.3 | 4.0 |
| Center hardness (A) | 60 | 66 | 62 | 57 | 68 |
| Surface hardness (B) | 82 | 88 | 78 | 72 | 73 |
| (B-A)/A (%) | 37 | 33 | 26 | 26 | 7 |
| (Ball) | | | | | |
| Coefficient of restitution | 99 | 102 | 95 | 98 | 101 |
| Flight distance (Carry) (yard) | 238 | 240 | 232 | 236 | 240 |
| Durability | 100 | 120 | 90 | 100 | 110 |
| Shot feel | ⊚ | x | ⊚ | ⊚ | ○ |

As is apparent from the results shown in Tables 4 and 5, the golf ball of the present invention of Examples 1 to 3 adjusted an amount of a co-crosslinking agent, an organic peroxide and an organic sulfide compound in the rubber composition for the core, and a trans-structure content in the core after vulcanization to a specified range, has better flight performance, durability and shot feel than the golf ball of Comparative Examples 1 to 5.

On the other hand, in the golf ball of Comparative Example 1, the rebound characteristics are degraded, because the core comprises no organic sulfide compound and the technical effects of increasing the trans-structure content are not obtained. In the golf ball of Comparative Example 2, the shot feel of is poor, because the amount of the vulcanization initiator in the core is too large and the core has higher hardness and larger deformation amount. In the golf ball of Comparative Example 3, the rebound characteristics are degraded, because the amount of the organic sulfide compound in the core is too small and the technical effects of increasing the trans-structure content in the core are not obtained in spite of having the hardness as good as Example 1. In the golf ball, the durability is poor, because the amount of the zinc oxide in the core is too small and the degree of the crosslink of the vulcanized core is not sufficiently obtained. In the golf ball of Comparative Example 4, the rebound characteristics are degraded, because the amount of the organic sulfide compound in the core is too large and large amount of the organic sulfide compound which is not related to the crosslinking reaction remains in the vulcanized article. In the golf ball of Comparative Example 5, the shot feel is poor, because the rate of (B-A)/A is too small in spite of having the deforming amount as good as Examples.

What is claimed is:

1. A solid golf ball comprising at least one layer of core, and at least one layer of cover formed on the core, wherein the inmost core layer is formed from a vulcanized molded article of a rubber composition comprising 20 to 40 parts by weight of α,β-unsaturated carboxylic acid or metal salt thereof, 0.3 to 1.8 parts by weight of a vulcanization initiator, 0.1 to 5 parts by weight of an organic sulfide compound, based on 100 parts by weight of a base rubber, and has a trans-structure content after vulcanization of 10 to 50%, and the core has a rate of (B-A)/A of not less than 15%, and not greater than 70% wherein A is a center hardness in JIS-C hardness of the core and B is a surface hardness in JIS-C hardness of the core and B is in the range of 60 to 85.

2. The solid golf ball according to claim 1, wherein the base rubber is high-cis polybutadiene rubber containing not less than 80% of a cis-1, 4-structure, and the core has a difference between a trans-structure content before and after vulcanization of 5 to 45%.

3. The solid golf ball according to claim 1, wherein the organic sulfide compound is disulfide compound.

4. The solid golf ball according to claim 2, wherein the core has a difference between a trans-structure content before and after vulcanization of 7 to 30%.

5. A solid golf ball comprising at least one layer of core, and at least one layer of cover formed on the core, wherein the inmost core layer is formed from a vulcanized molded article of a rubber composition comprising 20 to 40 parts by weight of α,β-unsaturated carboxylic acid or metal salt thereof, 0.3 to 1.8 parts by weight of a vulcanization initiator, 0.1 to 5 parts by weight of an organic sulfide compound, based on 100 parts by weight of a base rubber, and has a trans-structure content after vulcanization of 10 to 50%, and the core has a rate of (B-A)/A of not less than 15%, and not greater than 70%, wherein A is a center hardness in JIS-C hardness of the core and B is a surface hardness in JIS-C hardness of the core and B is in the range of 70 to 84 and the core has a deformation amount 3.5 to 5.2 mm, when applying from an initial load of 10 kgf to a final load of 130 kgf.

* * * * *